(12) United States Patent
Anson et al.

(10) Patent No.: US 7,752,071 B2
(45) Date of Patent: Jul. 6, 2010

(54) JOB ANALYSIS

(75) Inventors: James Walter Anson, Newport (AU); William Francis Moore, Deepdene (AU)

(73) Assignee: Aequus Consulting Pty Ltd, Melbourne (AU)

( * ) Notice: Subject to any disclaimer, the term of this patent is extended or adjusted under 35 U.S.C. 154(b) by 1637 days.

(21) Appl. No.: 10/486,252

(22) PCT Filed: Aug. 5, 2002

(86) PCT No.: PCT/AU02/01041

§ 371 (c)(1),
(2), (4) Date: Aug. 19, 2004

(87) PCT Pub. No.: WO03/014981

PCT Pub. Date: Feb. 20, 2003

(65) Prior Publication Data

US 2005/0010471 A1     Jan. 13, 2005

(30) Foreign Application Priority Data

Aug. 9, 2001  (AU) .................................... PR6913

(51) Int. Cl.
*G06F 11/34* (2006.01)
(52) U.S. Cl. ............................................ 705/11; 705/7
(58) Field of Classification Search .................. 705/10, 705/7, 11
See application file for complete search history.

(56) References Cited

U.S. PATENT DOCUMENTS 4,908,758 A  *  3/1990  Sanders ..................... 434/323

5,416,694 A       5/1995  Parrish et al.

(Continued)

FOREIGN PATENT DOCUMENTS

EP     1178425     7/2001

(Continued)

OTHER PUBLICATIONS

Jones, John W., Steffy, Brian D., and Bray, Weston. Applying Psychology in Business: The Handbook for Managers and Human Resource Professionals. Lexington Books, 1991.*

(Continued)

*Primary Examiner*—Beth V. Boswell
*Assistant Examiner*—Renae Feacher
(74) *Attorney, Agent, or Firm*—Blakely, Sokoloff, Taylor & Zafman

(57) ABSTRACT

A process and system for generating a job value for a job that can be used to provide a definitive measure of contribution of the job to an entity. The process involves generating an impact value representing effect of the job on an entity, generating an input value representing attributes of the job, and generating the job value on the basis of the impact value and the input value. The impact value is determined on the basis of an accountability value and a job type value. The accountability value represents results expected from the job by the entity, and the type value represents the significance of the job to the entity. The input value is determined on the basis of a knowledge value, and an integration value, and an interpersonal value. The knowledge value represents the level of knowledge required to perform the job. The integration value represents the level the job requires the coordination, integration and direction of resources. The interpersonal value represents the level of skill required to relate to and lead other parties.

14 Claims, 5 Drawing Sheets

U.S. PATENT DOCUMENTS 6,070,143 A    5/2000    Barney et al.

OTHER PUBLICATIONS

HR-Guide (HR-Guide. "HR Guide to the Internet: Job Analysis: Overview." HR-Guide. 1999 <http://www.job-analysis.net/G000.htm>) discloses a job analysis overview including methods of job analysis such as review of job classification systems, interviews and questionnaires.*

HR-Guide (HR-Guide. "HR Guide to the Internet: Job Evaluation: Methods: Ranking." HR-Guide. 1999 <http://www.job-analysis.net/G411.htm>) discloses comparing jobs to each other based on the overall worth of the job to the organization.*

HR-Guide (HR-Guide. "HR Guide to the Internet: Job Evaluation: Methods: Factor Comparison." HR-Guide. 1999 <http://www.job-analysis.net/G413.htm>) discloses a set of compensable factors identified to determine the worth of a job.*

HR-Guide (HR-Guide. "HR Guide to the Internet: Job Evaluation: Methods: Point Method." HR-Guide. 1999 <http://www.job-analysis.net/G414.htm>) discloses a point method which is an extension of the factor comparison where total point scores are derived for each job.*

* cited by examiner

| Accountability | | | Type | | |
|---|---|---|---|---|---|
| Level | Sub-level | Acc | 1 | 2 | 3 |
| I | i | 1 | 2 | 1 | 0 |
| | ii | 2 | 5 | 4 | 3 |
| | iii | 3 | 8 | 7 | 6 |
| | iv | 4 | 11 | 10 | 9 |
| II | i | 5 | 14 | 13 | 12 |
| | ii | 6 | 16 | 15 | 14 |
| III | i | 7 | 19 | 18 | 17 |
| | ii | 8 | 21 | 20 | 19 |
| IV | i | 9 | 24 | 23 | 22 |
| | ii | 10 | 26 | 25 | 24 |
| V | i | 11 | 29 | 28 | 27 |
| | ii | 12 | 31 | 30 | 29 |
| VI | i | 13 | 34 | 33 | 32 |
| | ii | 14 | 36 | 35 | 34 |
| VII | i | 15 | 39 | 38 | 37 |
| | ii | 16 | 41 | 40 | 39 |

Figure 2

| Knowledge | | | Integration | | | | | | | | | | | | | | |
|---|---|---|---|---|---|---|---|---|---|---|---|---|---|---|---|---|---|
| | | | 1 | | | | | 2 | | | | | 3 | | | | |
| Level | Kn | Ip | 1 | 2 | 3 | 4 | 5 | 1 | 2 | 3 | 4 | 5 | 1 | 2 | 3 | 4 | 5 |
| PF | 1 | | 4 | 5 | | | | 5 | 6 | 7 | | | 6 | 7 | | | |
| PS | 2 | | 6 | 7 | | | | 7 | 8 | 9 | | | 8 | 9 | 10 | 11 | |
| PA | 3 | | | | | | | | 10 | 11 | | | 10 | 11 | 12 | 13 | |
| CU | 4 | | | | | | | | 12 | 13 | | | 12 | 13 | 14 | 15 | |
| CS | 5 | | | | | | | | 14 | 15 | | | 14 | 15 | 16 | 17 | |
| CX | 6 | | | | | | | | 16 | 17 | | | 16 | 17 | 18 | 19 | |

| Knowledge | | | Integration | | | | | | | | | | | | | | |
|---|---|---|---|---|---|---|---|---|---|---|---|---|---|---|---|---|---|
| | | | 4 | | | | | 5 | | | | | 6 | | | | |
| Level | Kn | Ip | 1 | 2 | 3 | 4 | 5 | 1 | 2 | 3 | 4 | 5 | 1 | 2 | 3 | 4 | 5 |
| PF | 1 | | | | | | | | | | | | | | | | |
| PS | 2 | | | | | | | | | | | | | | | | |
| PA | 3 | | | | | | | | | | | | | | | | |
| CU | 4 | | | 15 | 16 | 17 | 18 | | | | | | | | | | |
| CS | 5 | | | 17 | 18 | 19 | 20 | | 19 | 20 | 21 | 22 | | | 22 | 23 | 24 |
| CX | 6 | | | 19 | 20 | 21 | 22 | | 21 | 22 | 23 | 24 | | | 24 | 25 | 26 |

| Knowledge | | | Integration | | | | | | | | | | | | | | |
|---|---|---|---|---|---|---|---|---|---|---|---|---|---|---|---|---|---|
| | | | 7 | | | | | 8 | | | | | 9 | | | | |
| Level | Kn | Ip | 1 | 2 | 3 | 4 | 5 | 1 | 2 | 3 | 4 | 5 | 1 | 2 | 3 | 4 | 5 |
| PF | 1 | | | | | | | | | | | | | | | | |
| PS | 2 | | | | | | | | | | | | | | | | |
| PA | 3 | | | | | | | | | | | | | | | | |
| CU | 4 | | | | | | | | | | | | | | | | |
| CS | 5 | | | | | | 25 | 26 | | | | 29 | 30 | | | | 31 | 32 |
| CX | 6 | | | | | | 27 | 28 | | | | | | | | | | |

Figure 3

JOB ANALYSIS

The present patent application is a non-provisional application of International Application No. PCT/AU02/01041, filed Aug. 5, 2002.

FIELD OF THE INVENTION

The present invention relates to job analysis, and in particular to methods of generating values that may be used to quantify a job, and a system for executing the method.

BACKGROUND OF THE INVENTION

One of the inherent difficulties in commerce is being able to generate a definitive measure of work or the contribution of work and jobs. The ability to identify, define, measure and compare the contribution of work or jobs to an entity, such as an employer, can prove to be particularly significant in determination of remuneration for employees, succession planning, negotiating with organisations, such as unions, and disputes involving dismissal of an employee. The ability to provide definitive measures can also be used to justify remuneration packages, at all levels in a company or organisation. The ability to provide a definitive measure however, and in particular one that is accepted by society, has to date proved elusive. It is desired however to provide a method and system that can be used to generate a definitive measure or at least provide a useful alternative to existing methods and systems.

SUMMARY OF THE INVENTION

In accordance with the present invention there is provided a process, performed by a computer system, for generating data representing a job value for a job, including:
  generating an impact value representing effect of said job on an entity, such as an organization or employer;
  generating an input value representing attributes of said job;
  generating data representing said job value on the basis of said impact value and said input value, wherein said job value provides a definitive measure of contribution of the job to the entity; and
  displaying the job for use by said entity, using said data.

BRIEF DESCRIPTION OF THE DRAWINGS

Preferred embodiments of the present invention are hereinafter described with reference to the accompanying drawings, wherein:
FIG. 2 is schematic diagram of impact data held in the diagnostic system;
FIG. 3 is a schematic diagram of input data held in the diagnostic system.

DETAILED DESCRIPTION OF PREFERRED EMBODIMENTS OF THE INVENTION

Figure 1:
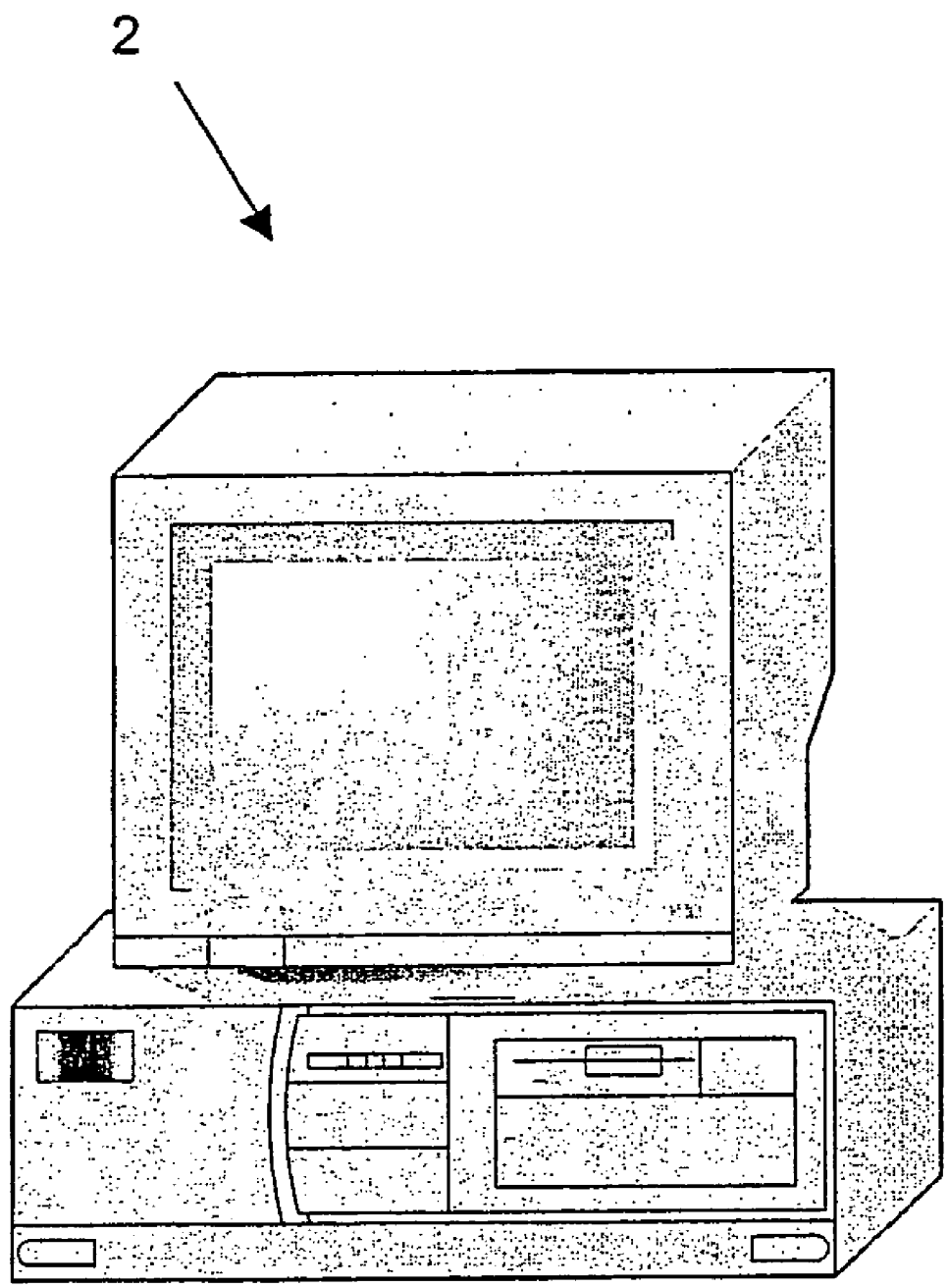
FIG. 1 is a diagram of a preferred embodiment of a diagnostic system.

The diagnostic system 2, as shown in FIG. 1, executes a method for identifying, defining, measuring and comparing the contribution work or jobs make to an entity, such as an organisation or employer. The method involves assessing work using a set of discrete variables and can be applied to all kinds of work at all levels in an entity. The method is executed on the basis of data stored in data tables of the diagnostic system, as shown in FIGS. 2 and 3. The system is able, to display the results of the job analysis, after selection is made concerning the values of attributes to be assigned to a job. Alternatively, the data can be represented in spreadsheet form, as shown in FIGS. 2 and 3. The diagnostic system 2 is a standard personal computer system having software code stored on disk storage thereof to execute the steps described below. Alternatively, the steps executed by the software can be executed by dedicated hardware components. The steps may be executed on one computer system or executed in a distributed manner across a number of systems connected by a communications network, such as the Internet. The values derived from the method can also be determined directly from the attribute data for the variables, as described below.

Figure 5:
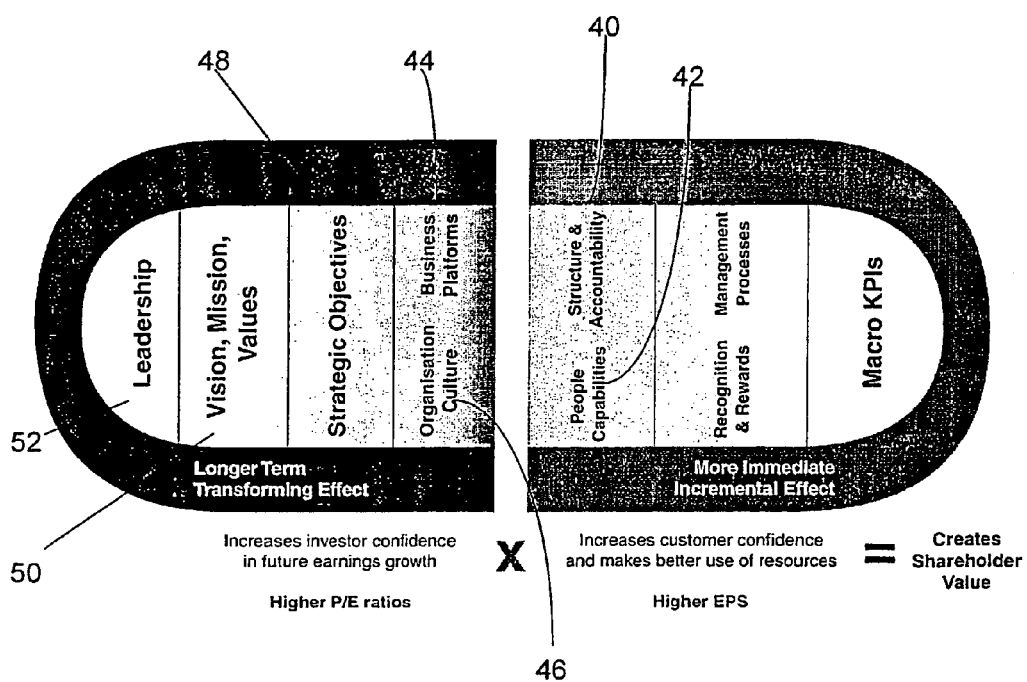
FIG. 5 is a diagram of a business driver model.

FIG. 5 illustrates a model for defining how work contributes to the achievement of organisational purpose. This model identifies all the key elements involved in achieving organisational success and indicates how these elements should be aligned and integrated. The section of the model which specifies the elements of Structure and Accountabilities 40 and People Capabilities 42 defines how work should be carried out. 'Structure' defines the way that work is linked across an organisation, 'Accountabilities' define the results expected from each job and 'Capabilities' define what individuals need to have in order to fulfil the job requirements. These elements define roles for people and provide the basis for organising work so that individuals are able to focus their own contributions and results towards the common goals of an organisation. The organisation may be any employer entity, such as a large public company, government department, small business, or single person. These two elements are important for organisational effectiveness. Effective utilisation of available organisational resources is dependent on appropriate alignment and integration of these two elements. People Capabilities 42 can be identified and measured according to 'Input' variables, and Structure and Accountabilities 40 according to 'Impact' variables, discussed below, and this makes it possible to determine relative measures for work.

Structure and Accountability are most directly influenced by Business Platforms 44, the processes that drive the operations and create value for customers and Organisation Culture 46, how work is done (e.g. who makes decisions about what, how problems are solved and innovations made). These in turn are influenced by what the organisation sets out to achieve, Strategic Objectives 48, and what its people aspire to, Vision, Mission and Values 50, which are shaped and articulated by Leadership 52 at all levels. These elements, which are shown on the left of FIG. 5, have a longer term and transforming effect on the operations by influencing structure, people, process and rewards. It is also these things that drive investment in the future of the organisation. Investment can be considered not only from an external perspective where various public companies compete for capital investment from the market, but also form an internal perspective where various operations within the company compete for investment allocations from limited corporate resources.

In any entity, the contribution work, activities or jobs make to the entity's purpose can be identified, defined, measured and compared according to a set of variables used by the diagnostic system 2. The variables used are: (i) Impact and (ii) Input. Impact represents the intended effect of the job on the entity. Input represents attributes of the job and in particular the capabilities required to resource the job.

Dimensions or attributes of Impact are accountability, representing the results expected; and type, representing how results are achieved. Dimensions or attributes of Input are: knowledge, representing the level of knowledge required; integration, representing coordination and synchronisation of required resources; and interpersonal, representing skills required to relate to and lead others.

More particularly, the variables used to generate the Impact and Input values are:

(i) Accountability (Acc). This represents results expected from the job. Levels of Accountability are indicated by the judgement job holders are expected to exercise to achieve the required outputs, and are determined by the complexity of the processes involved and the extent of their effect on an entity. Seven levels of accountability, each with a number of sublevels are defined, as shown in FIG. 2. The levels are constrained by and represent a known path for a job. They notionally also represent the limits of individuals. For example, level 1 may represent the accountability of a painter who has been employed to paint a room of a house. This type of job may have a number of sublevels up to 4 so that the painter can progress from an apprentice up to a person in charge of team of painters. Level 2 accountability may represent a job held by an interior designer who is responsible for the appearance of the room. For each level and respective sublevel an accountability value is assigned, ranging from 1 to 16, as shown in FIG. 2.

(ii) Type. This represents how the job has its most important and direct impact on the entity's results. Three types are defined having values 1, 2 and 3, as shown in FIG. 2. For example, a team leader may be assigned a value of 1, a team member may be assigned a value of 2, and a job having a support or advisory role is assigned a value of 3.

(iii) Knowledge (Kn). This represents the type and level of knowledge required to perform the job at a competent level. Six levels are defined, as shown in FIG. 3.

The levels are assigned values from 1 to 6, representing increasing knowledge. A job requiring only a foundation understanding of a process (PF) will be allocated a value of 1, a job requiring a standardised understanding of a process (PS) is allocated a value of 2, whereas a job requiring an advance understanding of a process (PA) is assigned a value of 3. The remaining levels represent concept universal (CU), concept specialised (CS) and concept expert (CX) being allocated values 4 to 6 respectively. The concept universal level represents an entry level which may be having acquired a university degree, whereas the concept specialised level represents the acquisition of knowledge that may have been acquired in the workplace after acquiring the degree. The concept expert level indicates that the knowledge represents that of an international expert in the field, for example an expert in business management.

(iv) Integration (In). This represents a requirement in the job to coordinate, integrate and direct resources. Nine levels are defined, from values 1 to 9, as shown in FIG. 3, with the highest level representing high integration skills. For example, the activities of jobs at the first level do not require any integration with the activities of others. Jobs at this level of integration are 'stand alone' and do not require the individual to coordinate or link with the actions of others for successful completion. Jobs at the highest level of integration, however require an individual to lead multiple profit centres representing different unrelated businesses, markets or regions of the world. This requires significant integration of major streams of activity for the organisation to be successful as a whole.

(v) Interpersonal (Ip). This represents skills required to relate to and lead others. Five levels are defined, as shown in FIG. 3, from values 1 to 5. Again the highest value represents excellent interpersonal skills. For example, jobs at the first level require only minimal interaction with others while jobs at the highest level are required to lead others by shaping a vision and modelling leadership behaviours.

Figure 4:
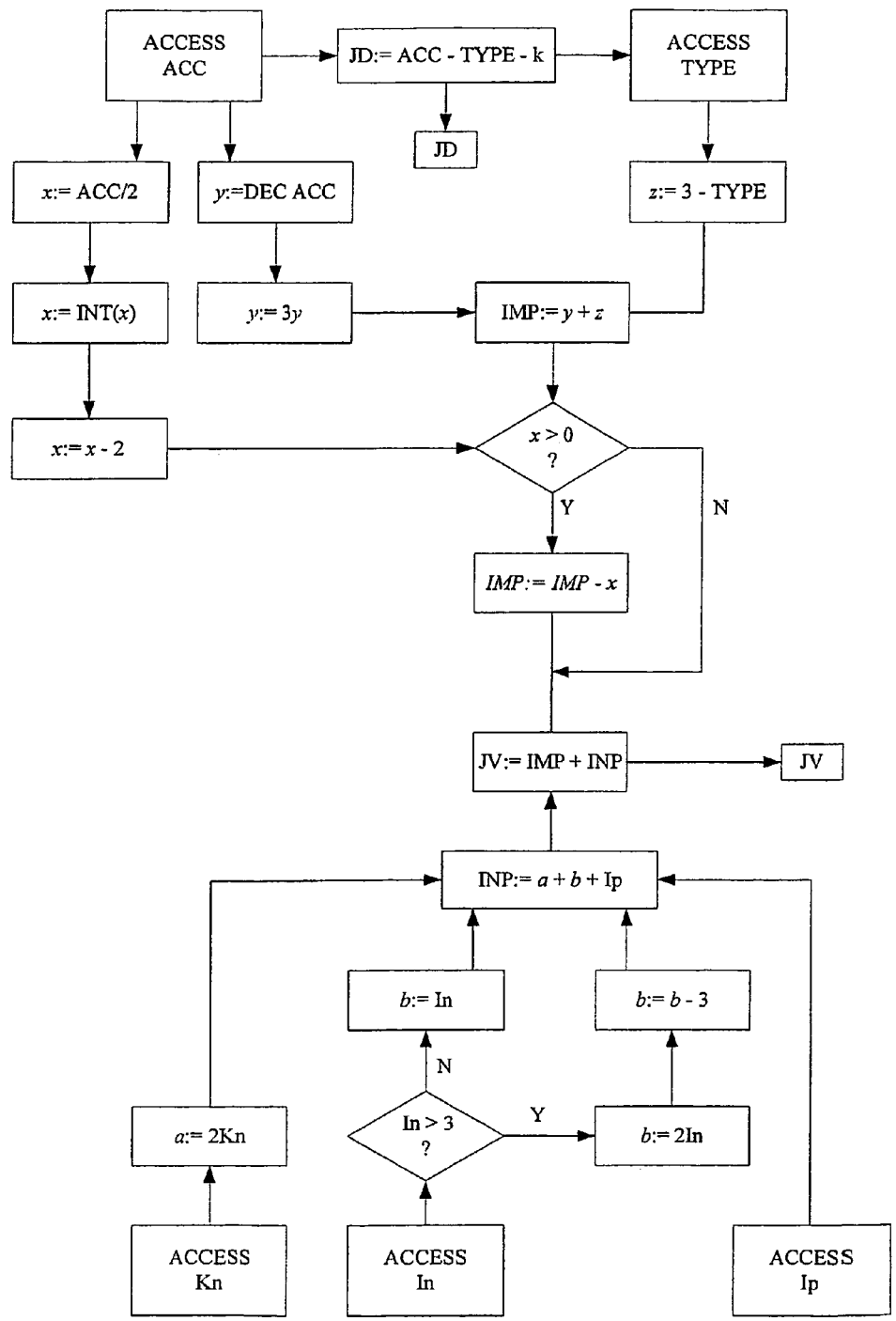
FIG. 4 is a flow diagram of a diagnostic process executed by the system.

Using values assigned to the variables described above, values can be obtained for Impact (IMP) and Input (INP) using the process shown in FIG. 4. The Impact value is derived by the diagnostic system executing the following:

$$\text{Impact}=3(\text{Acc}-1)+(3-\text{Type})-(\text{Integer}(\text{Acc}/2))^*2 \text{ when }>0) \quad (1)$$

where Acc represents the accountability value. The procedure dictated by Equation (1) prescribes a weighting of 3 to accountability at level 1, but above level 1 prescribes an average weighting of 2.5. These weightings have been derived from the variation in contribution which occurs at different organisational levels. In level 1 the incremental contribution in accountability increases more strongly across sublevels than it does in the higher levels. Hence a weighting of 3 has been prescribed for level 1 compared with weightings of 2.5 at the higher levels. The type value is given a basic weighting of 1. The diagnostic system can execute a procedure based on equation 1, as shown in FIG. 4, or can simply access the values for Impact from the data table, as shown in FIG. 2, using the accountability and type values as an index. A user of the system simply has to submit an accountability value and a type value for the job. The data values for the Accountability and Type variables entered by a user of the system or predetermined for a particular job selected by the user, are accessed by the system 2 for use in the generation procedure of FIG. 4.

The Input value is derived, as shown in FIG. 4, by executing the following:

$$\text{Input}=2\text{Kn}+\text{In}(\text{or }(2\text{In}-3)\text{ when In}>3)+\text{Ip} \quad (2)$$

where Kn represents the knowledge value, In represents an integration value and Ip represents an interpersonal value. Knowledge is given a weighting of 2 and integration a weighting of 1 below level 4, but a weighting of 2 above level. 4. For jobs below integration level 4, the knowledge requirement is more significant than integration in achievement of the job's objectives. Whereas at integration levels 4 and above, the requirement to integrate activities and resources is more important than it is at the lower levels and has been weighted at the same as knowledge at these levels. Interpersonal has a weighting of 1. Again, the diagnostic system either executes a process, as shown in FIG. 4, to calculate the Input value based on Equation (2) or the value is derived directly from a data table holding the Input values, as shown in FIG. 3, using the knowledge, integration and personal values as an index. The data values for the Knowledge, Integration and Interpersonal variables are selected and entered by a user into the system 2 or predetermined for a particular job, and the system then accesses these data values to generate the Input data. As can be seen from FIGS. 2 and 3, the Impact and Input values can also be derived directly from a spreadsheet including these values related to the respective variables.

Once values for the variables are determined, and Input and Impact values determined, job analysis can be performed to derive different job measures. For instance, a direct measure of the worth of a job can be obtained from a job value, that is derived by the diagnostic system summing the Impact and Input values, ie job value (JV)=Impact+Input.

A measure to determine whether a job has been allocated or positioned correctly can be represented by the difference between Impact and Input. This is because when jobs are correctly designed and operate at optimum effectiveness, there is a fundamental balance required between the Impact of a job and the Input required to successfully achieve the Impact.

A job design (JD) value that can be compared with the difference between Impact and Input, is obtained by the diagnostic system executing JD=Acc-Type-k, where k is constant as determined for an entity. Generation of the job design value is based on two principles. The first is that Impact is relatively more significant than Input at higher levels of Accountability because process complexity and the extent of effect of jobs are leveraged on the resources required for optimum performance. The second principle is that Input is relatively more significant than Impact at higher levels of Type because the team and advisory levels of Type require more collaboration and expert knowledge for optimum performance. Accordingly the job design value (JD) can be compared directly with the difference between Impact and Input to assess the allocation and positioning of jobs in an organisation for optimum effectiveness.

Organisational effectiveness (OE) is based on OE=f(IC+OS) where IC is individual capabilities; and OS is structure and accountabilities. A measure of OE can be determined by measuring and assessing the relationship between each of the variables that make up IC and OS, ie:

$$OE=f(INP, IMP, JD, IMP_1, IMP_2) \quad (3)$$

where INP is Input for a job, IMP is Impact for a job, $IMP_1$ is Impact of a direct supervisory job and $IMP_2$ is Impact of subordinate jobs. The organisational effectiveness for an entity, governed by a job for that entity, is therefore determinable on the basis of a function using the Input, Impact and job design values for that job and then Impact values for any supervisory roles, ie of a superior, and Impact values for any subordinate jobs associated with that job.

The diagnostics system, and the methods that it executes, are therefore particularly advantageous as they enable a number of measures to be obtained concerning the worth of a job to an organisation or entity. This can then be used to provide objective job value measures for a number of purposes, including justification for setting remuneration for jobs, succession planning, dismissal disputes, and negotiations with unions.

Many modifications will be apparent to those skilled in the art without departing from the scope of the present invention as herein described with reference to the accompanying drawings.

The invention claimed is:

1. A computer system, comprising:
    a processor;
    software code, executable by said processor, for:
    generating an accountability value representing results expected from the job by an employer entity;
    generating a type value representing importance of the job to the employer entity;
    generating an impact value representing effect of a job on said employer entity;
    generating an input value representing attributes of said job;
    generating job data representing a job value for said job, on the basis of said impact value and said input value wherein said job value provides a definitive measure of contribution of the job to the employer entity;
    displaying the job value for use by said employer entity, using said job data; generating design data representing a job design value for the job on the basis of said accountability value and said type value;
    displaying the job design value for use by said employer entity, using the design data; and
    wherein said input value is determined on the basis of:

Input Value=2Kn+In (or 2(2In−3) when In>3)+Ip wherein Kn represents a knowledge value, In represents an integration value and Ip represents an interpersonal value.

2. A computer system as claimed in claim 1, wherein said job value is used to set remuneration for said job.

3. A computer system as claimed in claim 1, wherein said job value is used to determine the allocation of jobs within said entity.

4. A computer system as claimed in claim 1, said impact value is determined on the basis of an accountability value and said type value.

5. A computer system as claimed in claim 1, wherein the type value has different values for a team leader, a team member and a support role.

6. A computer system as claimed in claim 1, wherein said impact value is generated based on:

Impact Value=3(Acc−1)+(3−Type)−(Integer(Acc/2)−2 when >0)

where Acc represents the accountability value.

7. A computer system as claimed in claim 1, wherein the knowledge value represents the level of knowledge required to perform the job.

8. A computer system as claimed in claim 1, wherein the integration value represents the level the job requires the coordination, integration and direction of resources.

9. A computer system as claimed in claim 1, wherein the interpersonal value represents the level of skill required to relate to and lead other parties.

10. A computer system as claimed in claim 1, wherein said job value is generated by adding said impact value to said input value.

11. A computer system as claimed in claim 1, wherein said job design value is used to determine whether the job has been allocated correctly for the entity.

12. A computer system as claimed in claim 1, wherein said job design value is generated on the basis of: Job Design Value=Acc−Type−k, where Acc is the accountability value, Type is the type value and k is a constant.

13. A computer system as claimed in claim 1, wherein an organisational value for said entity is generated on the basis of said impact value, said input value, said job design value, and an impact of related jobs.

14. Computer readable storage having code stored thereon for use in executing a process comprising:
    generating an accountability value representing results expected from the job by an employer entity;
    generating a type value representing importance of the job to the employer entity;
    generating an impact value representing effect of a job on said employer entity;
    generating an input value representing attributes of said job;
    generating job data representing a job value for said job, on the basis of said impact value and said input value wherein said job value provides a definitive measure of contribution of the job to the employer entity;
    displaying the job value for use by said employer entity, using said job data; generating design data representing a job design value for the job on the basis of said accountability value and said type value;
    displaying the job design value for use by said employer entity, using the design data; and
    wherein said input value is determined on the basis of:

Input Value=2Kn+In (or 2(2In−3) when In>3)+Ip wherein Kn represents a knowledge value, In represents an integration value and Ip represents an interpersonal value.

* * * * *